Jan. 31, 1961 P. V. HORTON 2,970,296

PRINTED CIRCUIT FERRITE CORE MEMORY ASSEMBLY

Filed May 10, 1955 3 Sheets-Sheet 1

INVENTOR
PAUL V. HORTON
BY William V. Schellberg
AGENT

PRINTED CIRCUIT FERRITE CORE MEMORY ASSEMBLY

Filed May 10, 1955 3 Sheets-Sheet 2

INVENTOR
PAUL V. HORTON
BY William V. Schellberg
AGENT

PRINTED CIRCUIT FERRITE CORE MEMORY ASSEMBLY

Filed May 10, 1955

INVENTOR
PAUL V. HORTON

BY William V. Schelberg
AGENT 2,970,296

PRINTED CIRCUIT FERRITE CORE MEMORY ASSEMBLY

Paul V. Horton, Poughkeepsie, N.Y., assignor to International Business Machines Corporation, New York, N.Y., a corporation of New York Filed May 10, 1955, Ser. No. 507,229

3 Claims. (Cl. 340—174)

This invention relates to printed circuit techniques as applied to the fabrication of magnetic core memory arrays and is directed more particularly to an arrangement adapted for automatic production of such arrays.

Magnetic cores having a rectangular hysteresis characteristic are generally employed for memory purposes and are conventionally arranged in rows and columns with a single turn winding passing through the cores in each individual row and in each individual column to be used for selection of a particular core in a selected plane or group of planes by coincident energization of a single column and row winding. Each single plane is provided with a third winding comprising a sense winding that links each core of the plane in one or the other polarity sense or in alternate sense or with half the cores in one sense and half in the other sense so as to balance out the effects of those cores that are only partially excited by one or the other winding during coincident energization of a row and column winding to select a particular core for interrogation. In a three dimensional array, each plane of cores is also provided with a fourth winding conventionally termed the inhibit winding that is selectively pulsed during a write interval to prevent the combined effects of the magnetomotive forces provided by the row and column windings from causing a change in remanence state of the core in that plane when writing or rewriting information or binary characters in the array. In this instance of application, like positioned cores in the several stacked two dimensional array planes comprise bits of a binary word and the similar row and column windings of each bit plane are series connected so that on energization of these windings in coincidence, the core in each plane linked thereby would attain a one representing remanence state unless inhibited by pulsing the fourth winding individual to that plane.

Heretofore, magnetic core arrays of the type described have been assembled manually with the windings threaded through the cores and providing support therefor in the completed matrix. This means of assembly has become increasingly time consuming and expensive since arrays of greater capacity requiring a large number of cores are used, with the tendency being toward increasing bit capacity and use of smaller sized cores.

The present invention contemplates an assembly process employing printed circuit conductors and core windings wherein the assembly of core arrays is greatly facilitated and is adapted for performance under control of a programmed, self-regulated machine in an economical, high speed process. The assembly method is based upon the availability of photosensitive glass or plastic which makes possible the etching of small holes through a sheet of the material by acids and through which holes conductors are later developed by electroplating. In the process, a plate of such material is exposed to ultraviolet light through a photographic negative of the hole pattern with the acid etch being effective on the exposed areas at a much faster rate than on the unexposed areas. A similar procedure is then followed to provide supporting cavities for the cores in the sheet of material and printed circuit techniques are then employed to lay down circuit connections both on the surfaces of the sheet as well as through the formed holes.

Accordingly, one object of this invention is to provide a method for assembling a magnetic core array obviating the need for threading conductors through the cores by hand.

A further object of the invention is to provide a process for fabrication of magnetic core arrays that is capable of performance by a self-regulated programmed machine.

Another object of the invention is to provide an improved printed circuit magnetic core matrix.

Other objects of the invention will be pointed out in the following description and claims and illustrated in the accompanying drawings, which disclose, by way of example, the principle of the invention and the best mode, which has been contemplated, of applying that principle.

Figures 3, 4A, 4B:
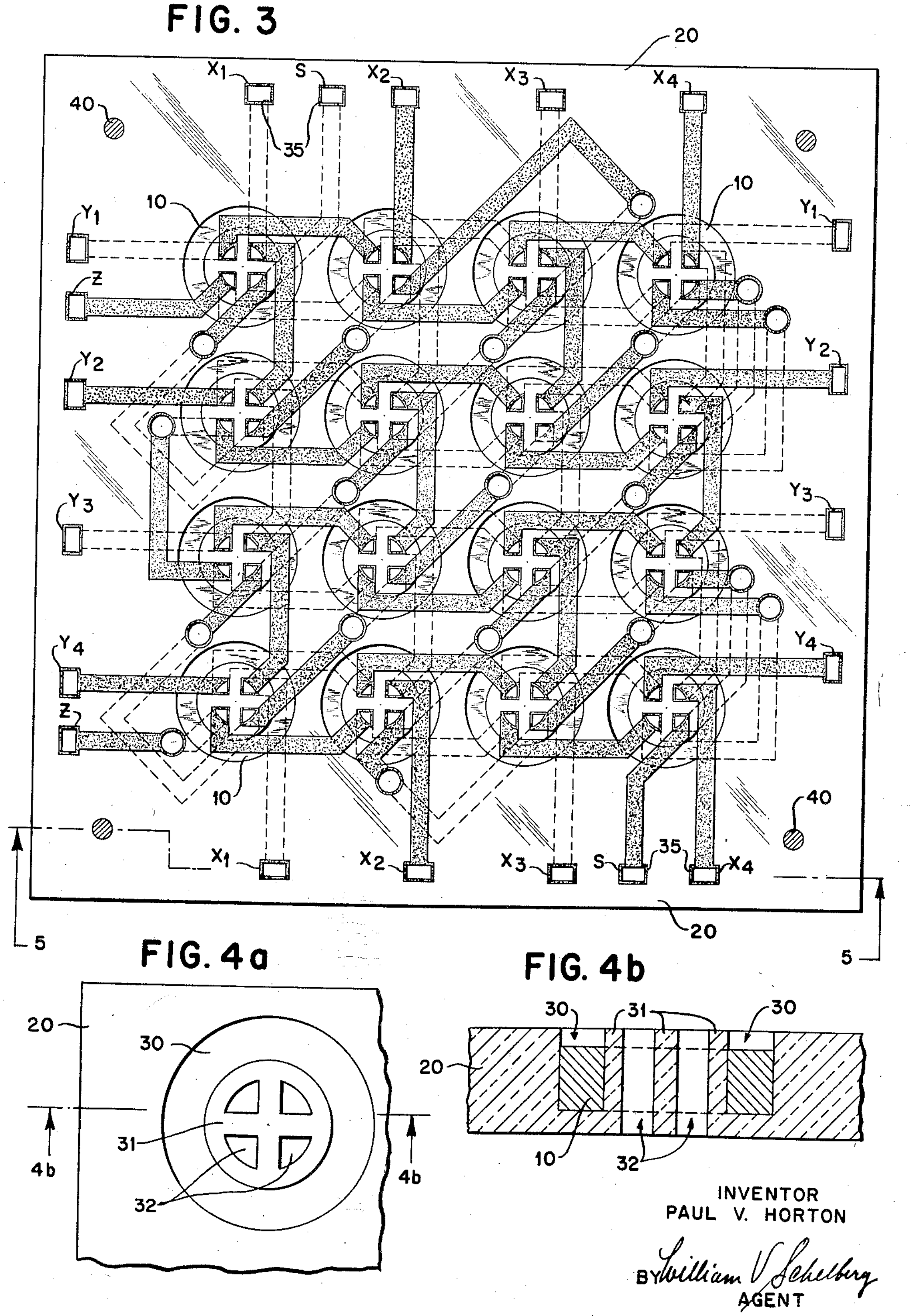
Figure 3 illustrates a single plane of a printed circuit array fabricated in accordance with the invention.

Figures *4a* and *4b* are views of a detailed section of the array shown in Figure 3.

Figure 5:
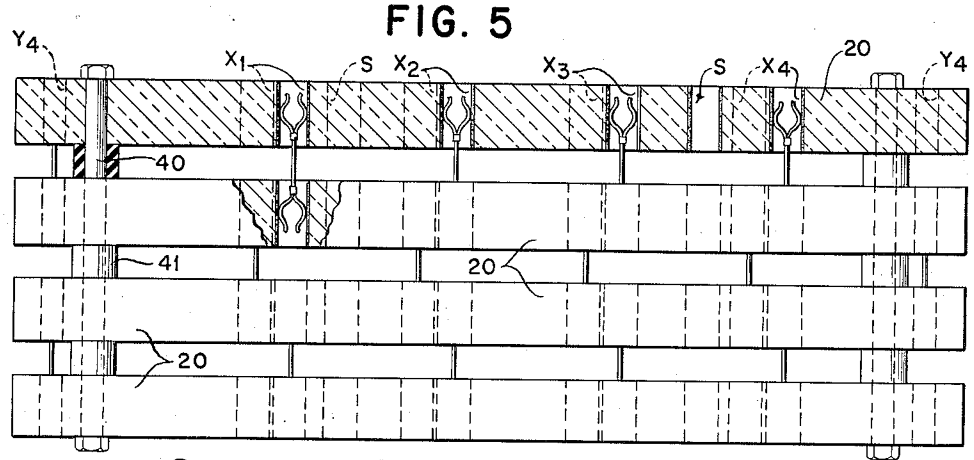

Figure 5 illustrates the arrangement of a group of printed circuit planes to form a three dimensional array.

Figure 1:
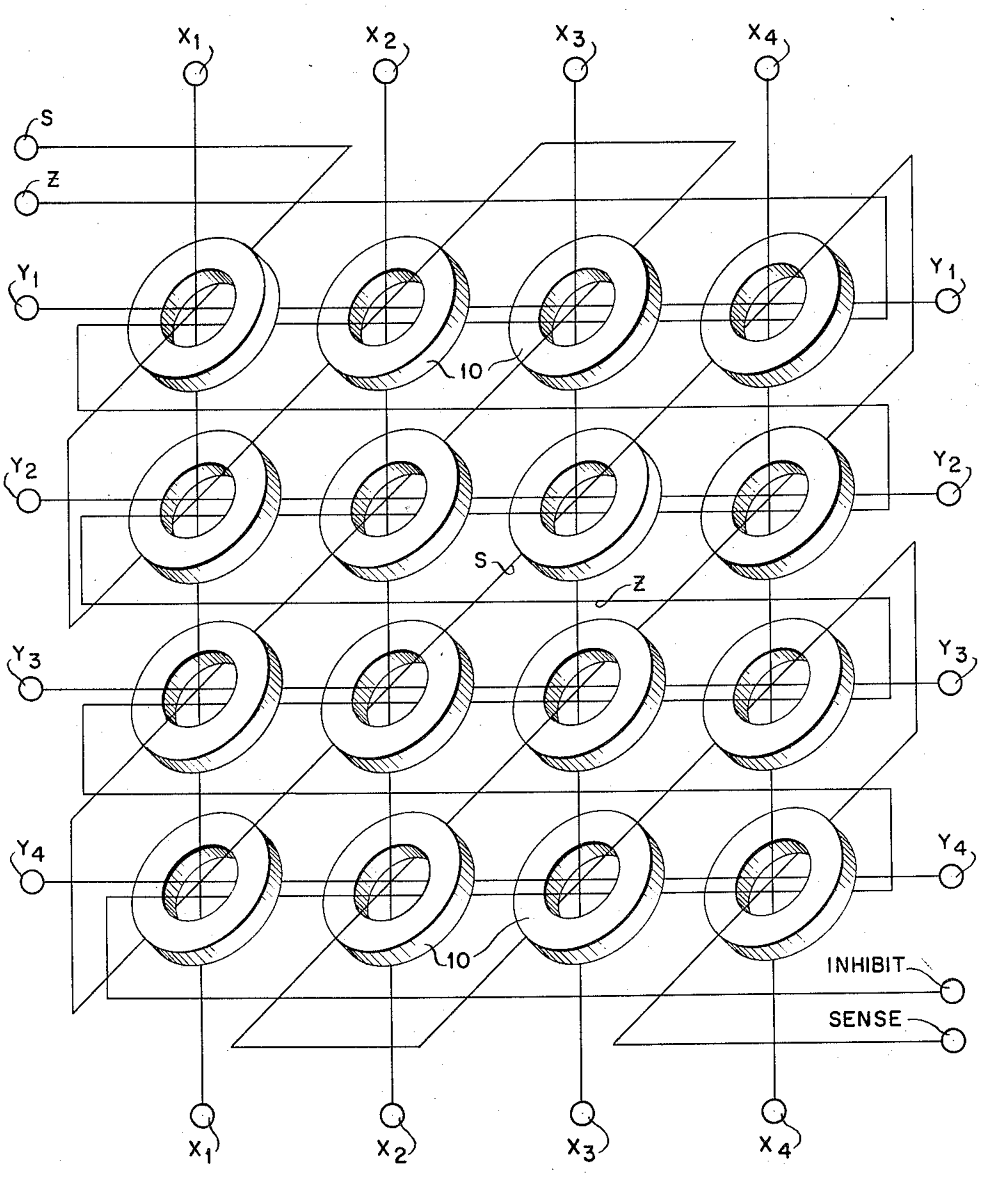
Figure 1 is a schematic diagram of a winding arrangement for one plane of a three dimensional array of magnetic cores.

A single plane of a typical three dimensional array of magnetic cores is shown in Figure 1 where toroidal cores 10 are shown arranged in rows and columns, as aforementioned, and linked by column windings X and row windings Y. Such an array is illustrated, for example, in an article entitled "Ferrites Speed Digital Computers" by D. R. Brown and E. Albers-Schoenberg, appearing on page 146 of Electronics magazine, issue of April, 1953, and described and claimed in the application of E. W. Bauer and M. K. Haynes, Serial No. 443,284, filed July 14, 1954, now Patent No. 2,889,540, which application is assigned to a common assignee.

Figure 2:
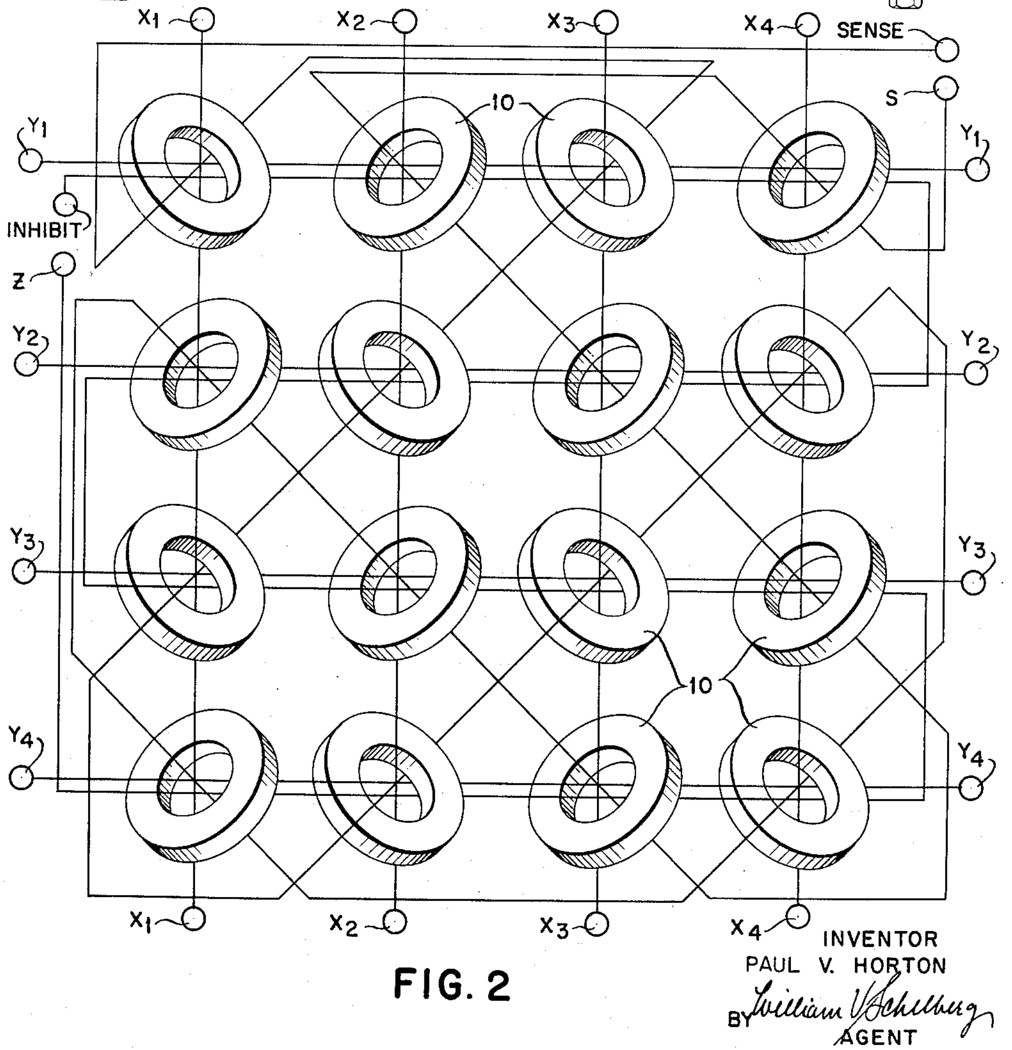
Figure 2 illustrates a further winding pattern arrangement for a magnetic core array.

In such an arrangement a particular core is selected for reading by the simultaneous energization of that X and that Y selection line or winding that embraces that particular core. The current pulse on each line provides a magnetomotive force to each core that it links, which force is less than the coercive force, and the single core energized by both windings then receives double the force. The selected core is thus caused to change from a binary one representing remanence state to a zero remanence state, if it held a binary one representation, and this flux change develops an induced voltage in a sense winding S indicating this fact. If a zero remanence state had been stored in the interrogated core, little flux change takes place and the sense winding signal is of low value so that storage of ones and zeros may be distinguished. Writing or storing a binary one state is similar to a reading operation but with the sense of the X and Y drive pulses reversed to cause the selected core located at the winding intersection to change from a zero remanence state to the one remanence state. This change also induces a voltage in the sense winding S but it is disregarded at write time by means of a gate not shown. Writing a zero may be accomplished in a two dimensional array by failure to apply the X and Y write direction pulses in coincidence and in a three dimensional array, where the X and Y lines link like positioned cores of plural planes to define words of plural bits, the X and Y line pulses may be applied in coincidence but their effect counteracted in selected planes, where zeros are desired, by pulsing an inhibit winding Z in that bit plane. The X, Y, S and Z windings are shown in Figure 1 and it is to be noted that the inhibit winding links all the cores in the same sense while the sense winding S links the cores in alternate diagonals in an opposite sense. The winding pattern of the sense winding as shown is such as to provide a bidirectional output signal but, since those cores that are linked only by the selected X or selected Y winding alone and are partially excited contribute some output signal on interrogation, the effects of non-selected cores tend to cancel one another. Many other sense winding configurations are feasible wherein the half select signals are counter balanced, as for example the arrangement shown in Figure 2, and the particular form shown in Figure 1 or Figure 2 is not to be considered limiting with respect to the printed circuit assembly shown hereafter.

Referring now to Figure 3, a single plane assembly of cores is shown in accordance with the invention with one suitable pattern of printed conductive areas bonded to a sheet of material 20 and duplicating the winding pattern of the X, Y, S and Z conductors shown in Figure 1. The material 20 may be a photo-sensitive glass or molded plastic such as that known by the trade name Photo-Form glass made by the Corning Glass Co. To achieve the proper winding directions and to provide the portion of the winding through the center of the cores, small holes are provided through the sheet of material. Further, to support the cores, recesses are provided in one surface of the sheet as shown in greater detail in Figures 4*a* and 4*b*.

To produce this structure, a photographic negative of the arrangement of holes is first prepared. The sheet of Photo-Form glass 20 cut to the desired size is then covered with the negative hole pattern and exposed under a mercury arc lamp or other ultraviolet light source. The portion of glass exposed to the light then has the ability to be etched away at a rate approximately fifty times faster than the unexposed portion. Using this process it is possible to etch 0.010 inch holes on 0.022 inch centers through a 0.050 inch thick glass sheet using hydrofluoric acid.

Following this procedure, a cavity 30, as shown in Figures 4*a* and 4*b* is also etched into one surface of the plate of material 20 to accommodate each ferrite core; with the depth of the cavity such as to allow the upper surface of the core to lie slightly below the upper surface of the sheet. With the spacings indicated above, and cores having an outside diameter of 0.100 inch and inside or hole diameter of 0.070 inch, the cores may be packed at a density of 64 cores or cavities 30 per square inch of glass surface. While particular dimensions have been mentioned in this regard, it is to be understood that other sized holes, cores and spacings may be used and those described are not to be considered limiting. For example, some applications use ferrite cores ranging in size down to 0.050 inch outside diameter with holes 0.030 inch in diameter and 0.15 inch thick.

As shown in Figures 4*a* and 4*b*, the region within the center of each core cavity is protected from the ultraviolet light exposure and consequently is not removed during the etching steps so that a post 31 is formed that rises through the center of each core. The photographic negative, however, provides a pattern for a set of four isolated holes 32 that are etched completely through the plate 20 and within the post 31.

After the holes and core cavities have been etched into the plate, the cores may be distributed and placed into position by the simple step of shaking and subsequent steps are then taken to develop conductors through the holes and on the plate surfaces to provide the required circuits and windings as indicated in connection with Figure 1. This circuitry development may be undertaken by any method for depositing the predetermined pattern arrangement of conductive areas known to the art such as by metal spraying through a stencil, photographic electrodeposition or other like process. A preferred method comprises covering the plate 20, now filled with ferrite cores, with a hot paraffin wax in order to pot each individual core in its cavity 30. The excess wax is sucked through the set of four 0.010 inch holes 32 within each of the posts 31 and the plate 20 then cooled to allow the wax to set and harden. The plate, now having the cores 10 in place and potted, is dipped in a bath of a strong oxidizing solution such as chromic acid made by saturating a sulphuric acid solution with sodium dichromate, followed by washing in tap water. This treatment causes the wax surface to be receptive to precipitated silver. The assembly is then completely coated with precipitated silver by immersion in a stock silver solution to which formaldehyde is then added. The stock solution is prepared by dissolving silver nitrate in water, with ammonium hydroxide gradually introduced until the brown precipitate which first forms disappears.

The film of silver provides the basis for the conductors to be formed by plating. The plate 20 is next coated on both sides with a film of photo resist, which may be an aqueous solution of gelatin, poly-vinyl alcohol or other resin to which potassium dichromate is added, and the assembly exposed to ultraviolet light through photos positives of the circuit pattern. Two positives are required, one for each side of the plate 20 and are positioned in registration with the holes passing through each core 10. The exposed glass plate 20 is next washed with water and the unfixed photo resist material in the areas where the circuitry is desired is removed so that the silver film is exposed only in these portions. The plate is now put into a copper plating bath and all the exposed silver coated areas representing circuitry are plated, with this plating also including the inside walls of the set of holes 32 and completing connections between the printed circuits on both sides of the plate to constitute the single turn windings through the cores 10. If desirable, a flash of gold may be applied on the top of the copper and the remaining photo resist material is then washed away leaving a background of silver remaining on the other plate surfaces. This background material may now be removed by a quick washing in dilute nitric acid after which the plate is washed in water and dried. The complete assembly is now developed having the printed wiring connected as described and with all the ferrite cores potted. To provide further protection the entire unit may be coated with wax or lacquer.

As shown in Figure 3, holes 35 are provided at the terminus of each printed conductor and may be used to receive a connection clip allowing ready coupling to external apparatus or to the interconnecting of groups of single planes to provide a three dimensional memory unit. These same holes or others of any desired shape and arrangement may be used to facilitate mounting a single plane or groups of superpositioned planes.

As seen in Figure 5, a group of single plane arrays are supported by rods 40 passing through such holes with spacers 41 provided between each pair of assembled arrays to allow space for circulation of cooling air.

While there have been shown and described and pointed out the fundamental novel features of the invention as applied to a preferred embodiment, it will be understood that various omissions and susbtitutions and changes in the form and details of the device illustrated and in its operation may be made by those skilled in the art without departing from the spirit of the invention. It is the intention therefore, to be limited only as indicated by the scope of the following claims.

What is claimed is:

1. A magnetic memory device comprising a single two dimensional plane of toroidal magnetic cores each capable of assuming stable remanence conditions, a plate of insulating material having a plurality of spaced ring shaped cavities within one surface thereof, cores within said cavities and encircling a pillar of said insulating material, a plurality of perforations extending through said pillars, an insulating potting material filling said cavities and embedding said cores, and electrically conductive regions defining windings and series circuits linking said cores, said regions being deposited upon opposite surfaces of said plate and over said potting material as well as through said perforations.

2. An array of magnetic cores each capable of assuming stable remanence conditions having windings wholly formed by printed circuit techinques and comprising a plate of insulating material having a plurality of spaced ring shaped cavities etched therein to a depth exceeding the thickness of said cores, said cores lying within said cavities so as to encircle a pillar of said insulating material and potted with paraffin wax, a plurality of holes extending through each said pillar to the surfaces of said plate, and printed circuit patterns on said plate surfaces interconnected through said perforations and forming winding circuits for said cores.

3. A magnetic memory device according to claim 1 wherein said spaced ring shaped cavities have a depth such as to allow the upper surface of the cores to lie slightly below the surface of said plate.

References Cited in the file of this patent

UNITED STATES PATENTS

| | | |
|---|---|---|
| 1,988,734 | Helgason | Jan. 22, 1935 |
| 2,588,726 | Hoover | Mar. 11, 1952 |
| 2,603,681 | Salisbury | July 15, 1952 |
| 2,654,142 | Horelick | Oct. 6, 1953 |
| 2,700,150 | Wales | Jan. 18, 1955 |
| 2,712,126 | Rosenberg et al. | June 28, 1955 |
| 2,719,965 | Person | Oct. 4, 1955 |
| 2,724,103 | Ashenhurst | Nov. 15, 1955 |
| 2,732,542 | Minnick | Jan. 24, 1956 |
| 2,734,150 | Beck | Feb. 7, 1956 |
| 2,757,443 | Steigerwalt et al. | Aug. 7, 1956 |
| 2,762,113 | Daniels et al. | Sept. 11, 1956 |
| 2,774,014 | Henry | Dec. 11, 1956 |
| 2,784,391 | Rajchman | Mar. 5, 1957 |
| 2,792,563 | Rajchman | May 14, 1957 |
| 2,823,371 | Jones | Feb. 11, 1958 |
| 2,870,433 | Simpson | Jan. 20, 1959 |